Figure 1:
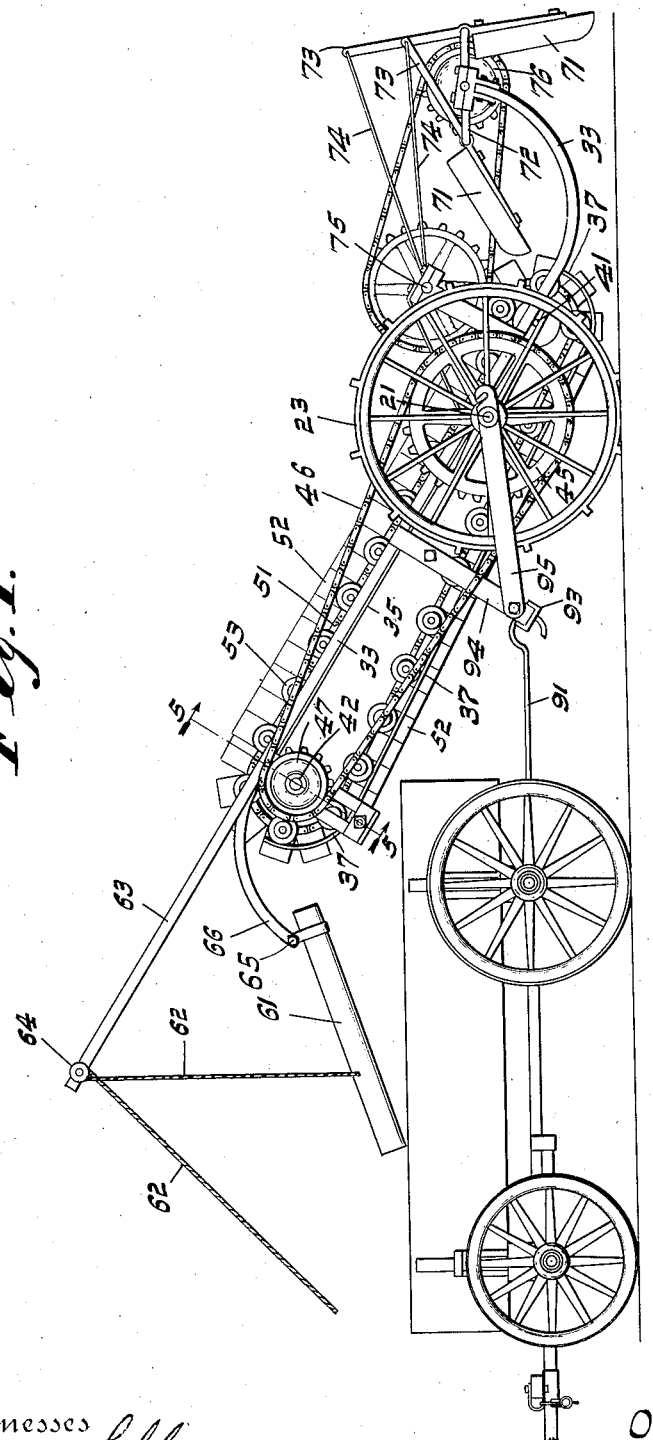

No. 889,326. PATENTED JUNE 2, 1908.
O. L. NEISLER.
EARTH HANDLING MACHINE.
APPLICATION FILED DEC. 14, 1907.

4 SHEETS—SHEET 1.

Witnesses
Frank A. Fahl
Thomas W. McMeans

Inventor
Oscar L. Neisler.
BY Bradford & Hood,
Attorneys.

No. 889,326. PATENTED JUNE 2, 1908.
O. L. NEISLER.
EARTH HANDLING MACHINE.
APPLICATION FILED DEC. 14, 1907.
4 SHEETS—SHEET 2.
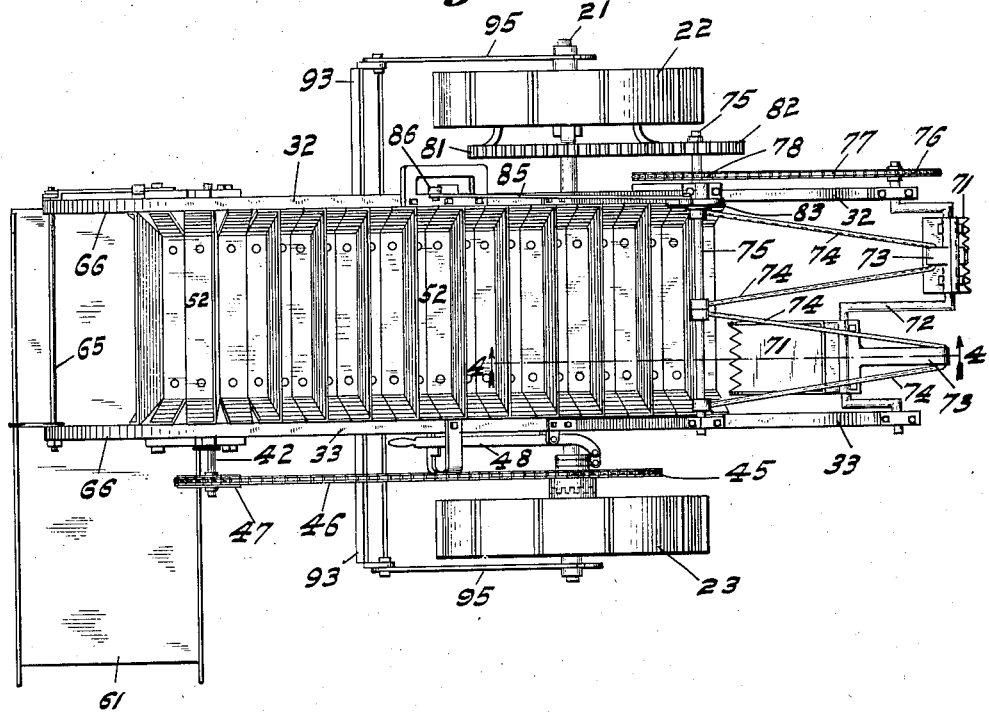
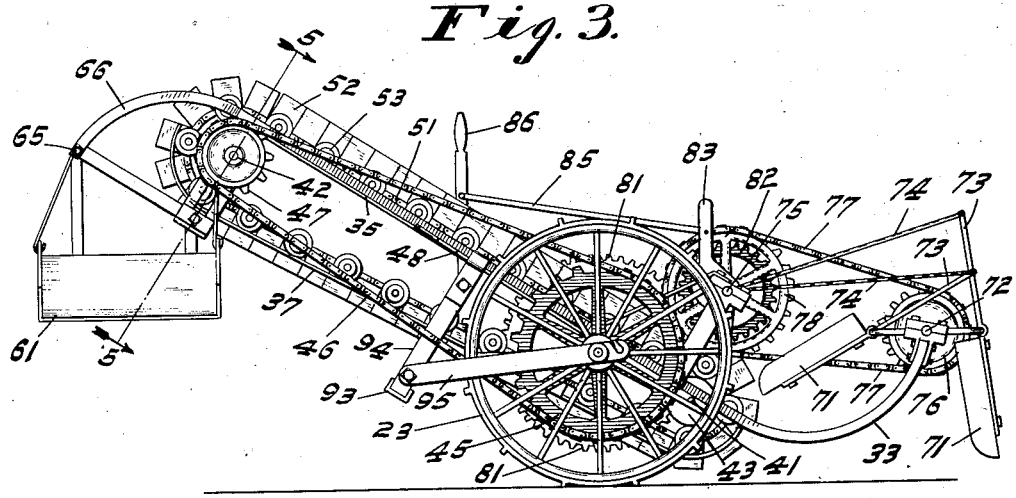

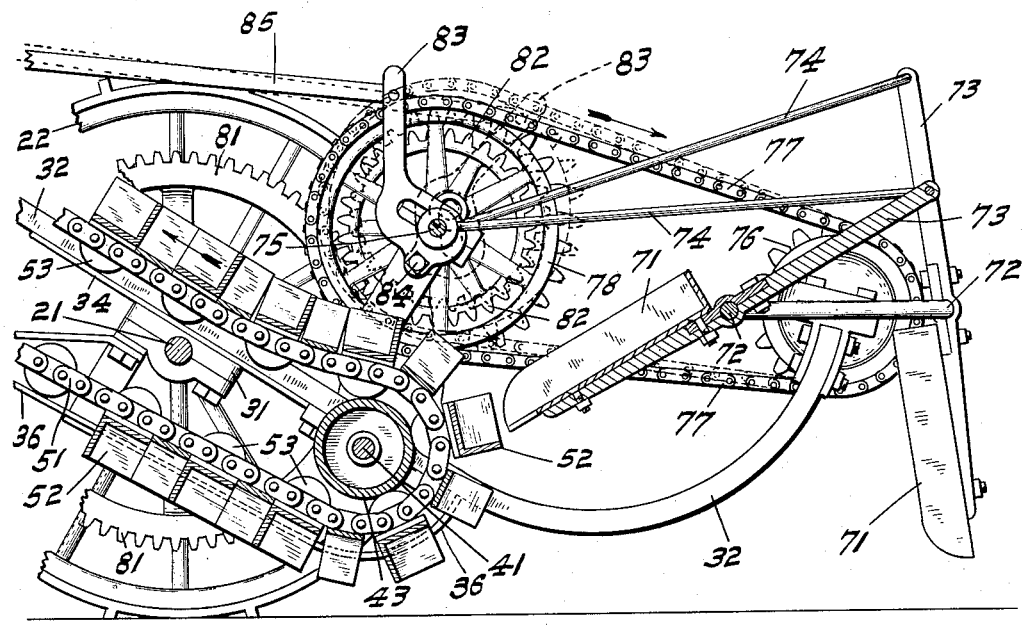
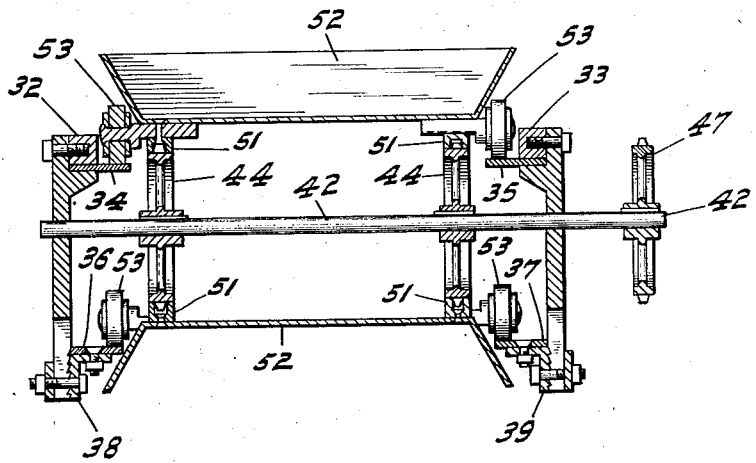

No. 889,326. PATENTED JUNE 2, 1908.
O. L. NEISLER.
EARTH HANDLING MACHINE.
APPLICATION FILED DEC. 14, 1907.
4 SHEETS—SHEET 4.
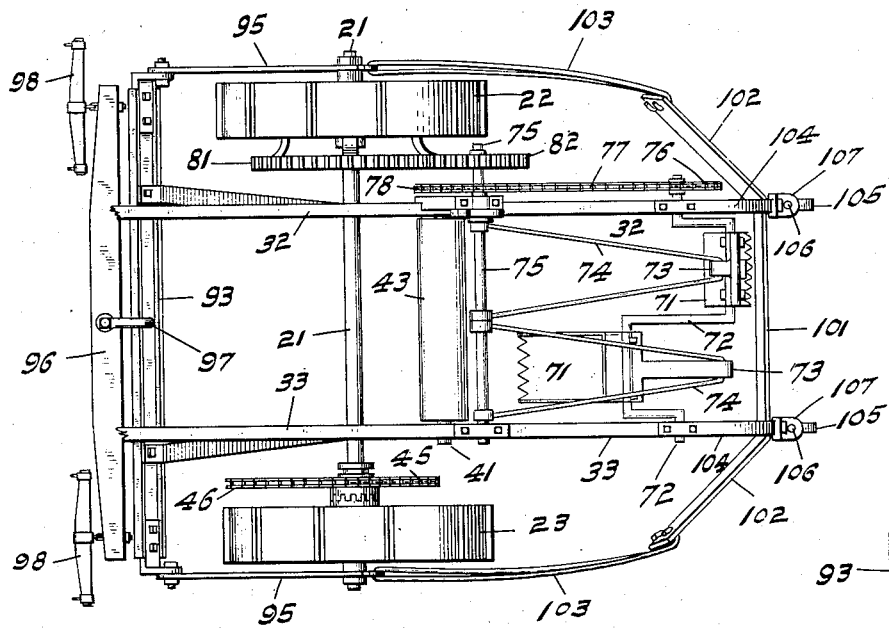
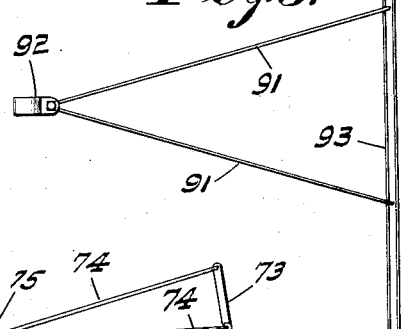
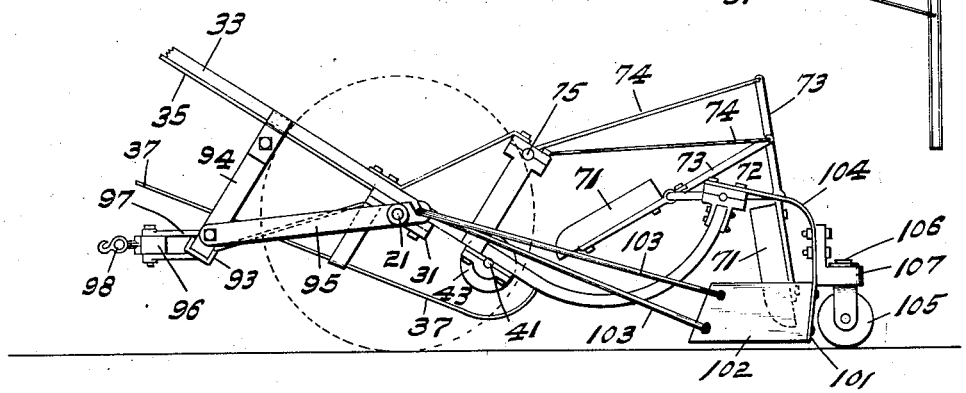
Witnesses
Frank A. Fahle
Thomas W. McMeans
Inventor
Oscar L. Neisler,
BY Bradford & Hood,
Attorneys.

UNITED STATES PATENT OFFICE.

OSCAR L. NEISLER, OF INDIANAPOLIS, INDIANA.

EARTH-HANDLING MACHINE.

No. 889,326.　　　　Specification of Letters Patent.　　　Patented June 2, 1908.

Application filed December 14, 1907. Serial No. 406,434.

*To all whom it may concern:*

Be it known that I, OSCAR L. NEISLER, a citizen of the United States, residing at Indianapolis, in the county of Marion and State of Indiana, have invented certain new and useful Improvements in Earth-Handling Machines, of which the following is a specification.

The principal object of my present invention is to provide a machine by means of which dirt, after being suitably loosened, (as by plowing) may be loaded onto a vehicle.

It consists in suitable means for shoveling, elevating and delivering the earth to various positions, as may be desired, and in various attachments by which the convenience and efficiency of the apparatus are increased, as will be hereinafter more particularly described and claimed.

Referring to the accompanying drawings, which are made a part hereof, and on which similar reference characters indicate similar parts, Figure 1 is a side elevation of a machine embodying my said invention as the same appears when in use in connection with an ordinary wagon; Fig. 2 a top or plan view of the machine in question, with the delivery chute arranged to discharge to one side thereof; Fig. 3 a side elevation of the machine, arranged as shown in Fig. 2; Fig. 4 a detail sectional view, on an enlarged scale, as seen when looking upwardly from the dotted line 4 4 in Fig. 2, a shifted position of some of the parts being shown by means of dotted lines; Fig. 5 a transverse sectional view as seen when looking in the direction indicated by the arrows from the dotted line 5 5 in Figs. 1 and 3; Fig. 6 a plan view similar in part to Fig. 2, but with the elevating devices removed and auxiliary scraping and road-finishing devices added; Fig. 7 a side elevation of the parts shown in Fig. 6, and Fig. 8 a detail view showing a means for connecting this machine to a vehicle.

Upon a main axle 21 I mount loosely two driving or traction wheels 22 and 23, and upon that portion of said axle between said wheels I mount, as by means of a suitable support or supports 31, a frame, the main members 32 and 33 of which extend lengthwise of the machine. Secured to the main frame bars 32 and 33 are tracks 34 and 35 over which the trucks of the loaded side of the main elevator run; and below, and carried by suitable supports attached to said main frame bars, are other tracks 36 and 37 over which the trucks of the idle side of the elevator run. These tracks are preferably secured to the adjacently fixed frame bars by adjustable brackets 38 and 39. Mounted in said frame near its ends are shafts 41 and 42. The shaft 41 is an idle shaft and carries a drum 43. The shaft 42 is the driving shaft of the elevator, and carries sprocket wheels 44. Around these wheels and drum the elevator travels in operation, said shaft 42 being driven from the driving or traction wheel 23 through a sprocket wheel 45, a sprocket chain 46 and a sprocket wheel 47 on the shaft 42. The sprocket wheel 45 and the traction wheel 23 are provided with suitable clutch faces on their hubs (see especially Fig. 2)-and said wheel 45 may be thrown into or out of engagement with said traction wheel 23, by means of a suitable clutch-lever 48, as will be readily understood.

The elevator itself is composed of suitable sprocket chains 51 having buckets 52 secured thereto, and provided also with trucks 53 which pass over the tracks 34, 35, 36 and 37. These trucks 53 run idly over the drum 43, and pass thence onto the tracks, as is best shown in Figs. 4 and 5.

At the upper end of the elevator I provide a guiding or delivery chute 61 by means of which the dirt as it is thrown from the elevator will be guided to the point in the vehicle desired. In Fig. 1 I have shown the free end of this delivery chute supported by means of a cord 62 to a mast 63, carried by the elevator frame, said cord 62 passing over the sheave 64 and thence down to a position convenient to the driver of the vehicle, thus enabling said driver to manipulate the chute at will. The receiving end of said chute is supported on arms 66 or a bar 65 carried thereby In Fig. 1 this chute is shown as leading toward the front of the vehicle. In Fig. 2 it is shown as attached in a different manner, and leading off to one side, so that vehicles can be loaded at the side of the apparatus, by this means, when desired. In either event its inner end (nearest the elevator) is supported by suitable attachments, as shown, from the arms 66 (which may be a prolongation of frame members 32 and 33) and other convenient adjacent parts of the frame.

In order to place the dirt on the elevator without hand labor I have provided suitable mechanically-operated shovels 71, which are arranged at a proper point behind the rear and lower end of said elevator. These shovels are mounted on a crank shaft 72, and their handles 73 are connected by means of rods 74 with a suitable support on the frame of the machine. For convenience I have utilized the shaft 75 as such support. The shaft 72 has a sprocket wheel 76 from which a sprocket chain 77 runs to the corresponding sprocket wheel 78 on the shaft 75. This shaft 75 is designed to be driven from the driving or traction wheel 22. This wheel is therefore shown as provided with a spur gear wheel or rim 81, which is adapted to mesh with and drive a smaller spur gear wheel 82 on the same shaft 75 which carries the sprocket wheel 78. The speed of the shovels therefore considerably exceeds that of the wheels 22 and 23. These gear wheels 81 and 82 are adapted to be thrown out of engagement by means of a cam lever 83 pivotally mounted on the frame of the machine at 84 and adapted to be operated through a link 85 by a suitable hand lever 86. The movement is indicated by the dotted lines in Fig. 4, where the wheel 82 is thus shown as thrown up to a point out of engagement with the wheel 81.

This machine, as before indicated, is intended to be used in loading earth onto wagons, thus dispensing with the slow and laborious hand shoveling by which such work is usually performed. In its use (as, for example, in the making of roads) the earth is first plowed up into a loose condition, as is common. The apparatus, generally assembled and arranged as shown in Fig. 1, is then driven over the plowed and loosened earth. The shovels 71, driven at considerable speed, throw the earth up onto the elevator, by which it is conveyed to the desired elevation, and there delivered into the wagon body. The chute 61 is used in cases where it is desired to direct the delivery to a point not immediately under or closely adjacent to the discharge end of the elevator. In this arrangement the shovel and elevating apparatus is shown as connected to the rear axle tree with the wagon by draw rods 91 (see Figs. 1 and 8) which extend from a clip 92 (encircling the wagon-axle) back to a bar 93 which is carried from the elevator frame and from the traction wheel axle by supports, as 94 and 95. In other cases the machine may be drawn by means of a double-tree 96 connected to the bar 93, as by clevis 97, and extending out to points sufficiently far to carry swingle-trees 98, to which the draft animals may be immediately attached.

In road making, after the greater portion of the dirt has been removed, it is desirable to level and form the roadway on the final passage of the apparatus over it. For this purpose I have provided a scraper and gatherer, as shown in Figs. 6 and 7. This consists of a suitable scraping bar or plate, preferably composed of a central straight portion 101 extending squarely across the center of the roadway and inclined scraping and gathering wings 102 extending outwardly and forwardly therefrom. This is attached to the apparatus by draft rods 103 and supporting bars 104, and is also supported in the proper relation to the surface upon which it is operated by trucks or caster-wheels 105 carried on swiveling stems 106 mounted in brackets 107. By this attachment the roadway can be left in a substantially finished condition, ready for rolling, and the application of the surface coat or paving.

Having thus fully described my said invention, what I claim as new, and desire to secure by Letters Patent, is:—

1. The combination, in an earth handling machine, of a supporting shaft, traction driving wheels mounted on the ends of said shaft, a carrier frame mounted on said shaft between said wheels, driving means connected with one of the traction driving wheels for driving said carrier, means for throwing said driving means into and out of engagement with said driving wheel, loading devices for throwing the material on to the carrier, means connected with the other traction driving wheel for operating said loading means, and means for throwing said operating means into and out of engagement with said driving wheel.

2. The combination, in an earth handling machine, of a main axle, traction driving wheels mounted on the ends of said axle, a carrier frame mounted on said axle between said driving wheels, shafts mounted on said frame near its ends, wheels on said shaft upon which an endless carrier is directly mounted, tracks on the carrier frame intermediate said wheels, and an endless carrier having anti-friction trucks mounted upon and passing over said wheels and said tracks.

3. The combination, in an earth handling machine, with an endless carrier, of means for delivering material to said carrier consisting of shovels pivotally mounted on a crank shaft, stay rods for holding the shovels from complete revolution on said crank shafts, and means for revolving said crank shaft and thereby giving said shovels a reciprocating movement.

4. The combination, in an earth handling machine, of a main axle, traction driving wheels mounted on the ends of said axle, an endless carrier also mounted on said axle, means actuated by one of said traction driving wheels for driving said endless carrier, shoveling devices mounted on said machine in proximity to the receiving end of said carrier, and an operative driving connection between said shoveling devices and the other of said traction driving wheels.

5. The combination, in an earth handling machine, of an endless carrier, means for driving the same, devices for throwing the material onto said carrier, means for operating the same mechanically, and a scraping and leveling attachment arranged in proximity to said material-throwing devices.

6. The combination, in an earth handling machine, of an endless carrier, suitable transporting and driving means upon which the same is mounted, devices for throwing the material onto said carrier, a driving traction wheel each for said carrier and said material-throwing devices, operative connections between said carrier and said material-throwing devices and their respective driving wheels, and means for throwing said operative connections into and out of engagement at will.

7. The combination, in an earth handling machine, with the carrier, means for driving the same, material-handling devices for throwing the material onto the carrier, means for driving the same, an adjustable chute arranged in proximity to the delivery end of the carrier for receiving and guiding the material as it comes therefrom to the desired point of delivery, and means whereby said chute may be adjusted to deliver in any desired direction.

In witness whereof, I have hereunto set my hand and seal at Indianapolis, Indiana, this eleventh day of December, A. D. one thousand nine hundred and seven.

OSCAR L. NEISLER. [L. S.]

Witnesses:
 CHESTER BRADFORD,
 THOMAS W. MCMEANS.